W. D. LUTZ.
ACCELERATING DEVICE FOR ALTERNATING CURRENT MOTORS.
APPLICATION FILED JAN. 7, 1911.

1,118,296.

Patented Nov. 24, 1914.

2 SHEETS—SHEET 1.

W. D. LUTZ.
ACCELERATING DEVICE FOR ALTERNATING CURRENT MOTORS.
APPLICATION FILED JAN. 7, 1911.

1,118,296.

Patented Nov. 24, 1914.
2 SHEETS—SHEET 2.

UNITED STATES PATENT OFFICE.

WILLIAM D. LUTZ, OF ALLENDALE BOROUGH, NEW JERSEY, ASSIGNOR TO OTIS ELEVATOR COMPANY, OF JERSEY CITY, NEW JERSEY, A CORPORATION OF NEW JERSEY.

ACCELERATING DEVICE FOR ALTERNATING-CURRENT MOTORS.

1,118,296.   Specification of Letters Patent.   Patented Nov. 24, 1914.

Application filed January 7, 1911. Serial No. 601,426.

*To all whom it may concern:*

Be it known that I, WILLIAM D. LUTZ, a citizen of the United States, residing in the borough of Allendale, in the county of Bergen and State of New Jersey, have invented a new and useful Improvement in Accelerating Devices for Alternating-Current Motors, of which the following is a specification.

My invention relates to motor control, more particularly to the acceleration of alternating current motors.

Electro-magnets are frequently employed to effect the acceleration of motors, but some difficulty is experienced in rendering alternating current magnets dependent for operation upon the speed of the motor.

In general the pull of an alternating current magnet varies directly with the volt-amperes and inversely as the frequency of the energizing current. That is, with an impressed voltage of a given value and a given number of turns in the magnet windings, the pull is greatest for the lowest frequency and decreases with an increase in frequency. When the voltage and frequency are constant, the pull varies inversely as the number of turns.

An object of my invention is to provide improved means to accelerate a motor, and this to be accomplished by a current of a frequency varying inversely as the speed of the motor, together with electro-responsive apparatus operated and controlled by said current.

Figure 1:
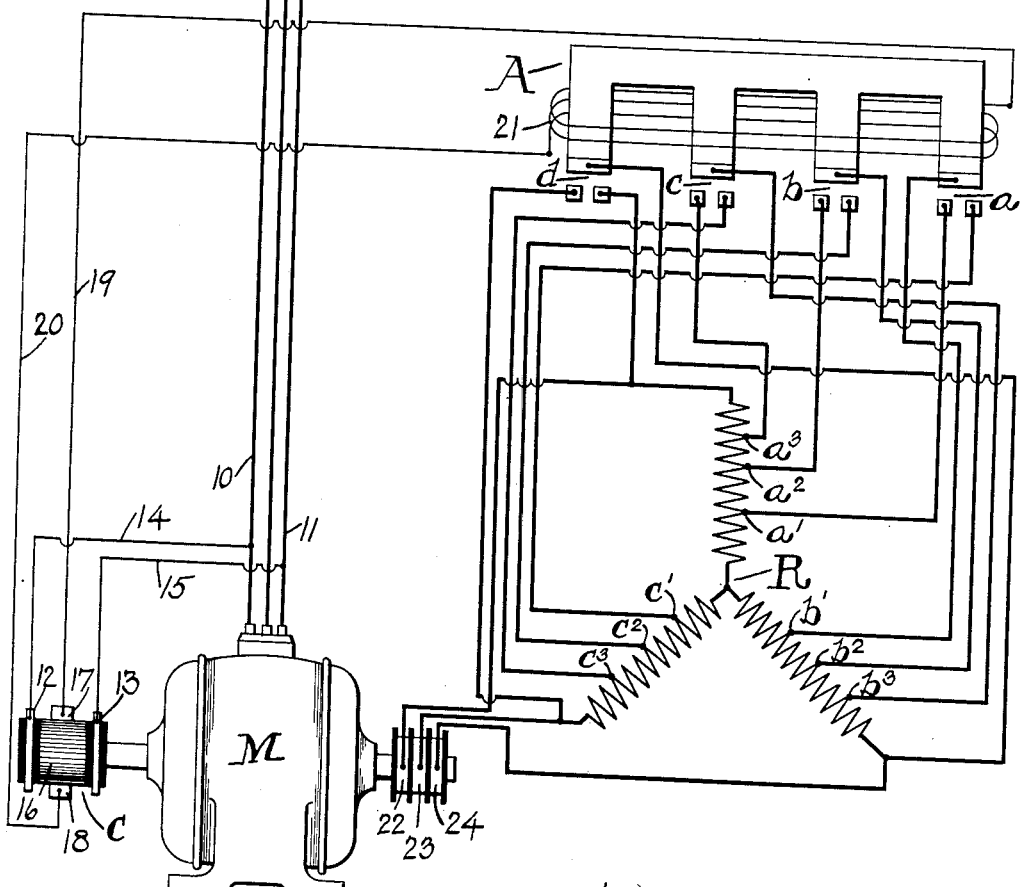
Figures 2, 3:
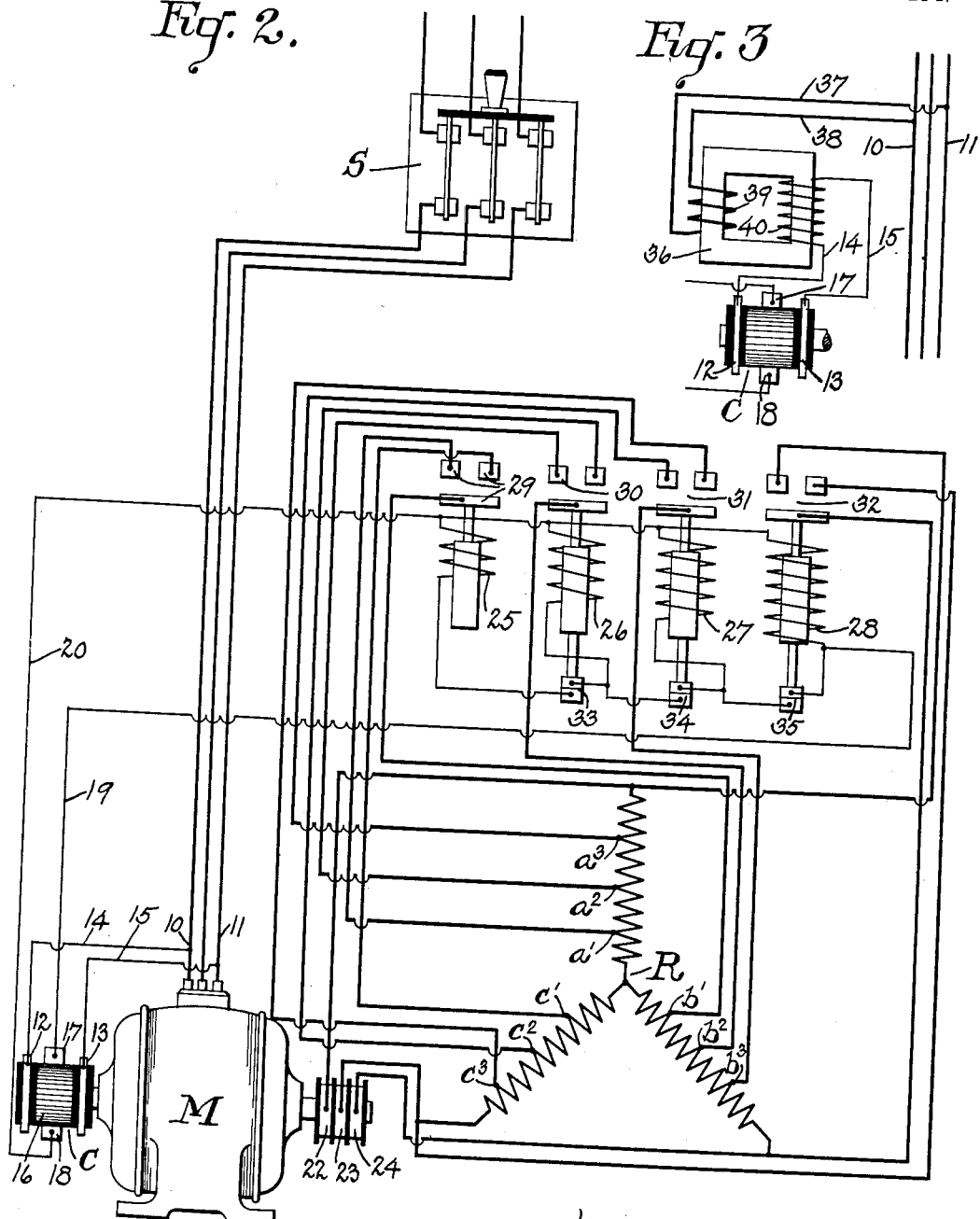

In the accompanying drawings, Figure 1 shows an embodiment of my invention in connection with a motor; Fig. 2 is similar to Fig. 1 except that magnets with different numbers of turns are employed; Fig. 3 shows a modification to change the potential applied to a rectifying or frequency changing commutator; Fig. 4 is a modification of a part of Fig. 2.

Referring now to Fig. 1 an alternating current motor M is shown having a slip-ring connection for an accelerating resistance R. An accelerating magnet A receives current from a frequency changer C attached to the shaft of the motor M or driven by it. A main switch S is to connect the motor to the supply mains.

The frequency changer C comprises contact rings 12, 13, which are connected by conductors 14, 15 to the motor leads 10, 11. The commutator bars 16 are connected alternately to the contact rings 12, 13, and the brushes 17, 18, which are so spaced as to be connected through the commutator bars to opposite rings 12, 13, provide collector terminals for the rectified current which is led by conductors 19, 20 through the magnet winding 21 of the accelerating magnet A. When the commutator is at rest the current is of the same frequency as that applied to the motor leads 10 and 11, because the terminals 19, 20 have a direct electrical connection through the slip rings and commutator bars with the leads 10 and 11. As the speed of the commutator is increased the frequency in the rectified circuit becomes less and less until at full speed, if there were no slip, the frequency in the rectified circuit would be zero or some predetermined frequency lower than the frequency applied to the motor leads 10 and 11. Obviously the frequency of the current supplied to the accelerating magnet is gradually reduced as the speed of the motor increases, because each time the brushes 17, 18, pass from one set of commutator bars to the next the circuit connections are reversed and neutralize a phase reversal. As the motor accelerates the number of phase reversals that are thus neutralized is gradually increased, or in other words, the frequency of the current supplied to the accelerating magnet is gradually decreased. The pull of an alternating current magnet increases as the frequency decreases, so the pull of the magnet A is greatest when the motor has attained full speed. Groups of contacts, as $a$, $b$, $c$, and $d$ are provided in connection with the accelerating magnet and the distances of the movable parts are so proportioned that the group of contacts are joined in the order named. Portions of the sectional resistance R, which is connected to the secondary winding of the motor, through the sliprings 22, 23, 24, are short-circuited in succession to accelerate the motor.

In Fig. 2, the same arrangement of the motor M, commutator C and resistance R, is shown, and a plurality of accelerating magnets having different numbers of turns, instead of a single accelerating magnet. These magnet windings 25, 26, 27 and 28 are connected in parallel across the rectified current mains 19, 20. Of these magnets, the first has only the accelerating contacts 29, while the others control the contacts 30, 31, 32, as well as the breaking contacts 33, 34 and 35, respectively; when one of the latter magnets is energized and operated, it breaks the magnet winding circuit for the magnet previously operated.

The operation of the accelerating magnets is dependent upon the alternating current from the commutator C', and since the magnets are all connected in parallel at the start, the magnet which has the least number of turns exerts the greatest pull. In the present embodiment the contacts 29 are first joined, short circuiting a portion of the starting resistance R. This causes the motor to be accelerated and the frequency of the current from the commutator is reduced. The second magnet winding 26 now receives more energizing current and by the operation of its core, contacts 30 are joined and the breaking contacts 33 separated. The action of the magnet 26 short circuits another portion of the sectional resistance R, and breaks the circuit through the magnet winding 25. In a similar manner the other magnets operate to short-circuit additional portions of the starting resistance and to open the circuit of the previously operated magnet. At full speed the secondary resistance of the motor is all short-circuited.

When the potential of the commutator circuit is too low or too high a transformer may be inserted in the circuit leading to the commutator C as shown by Fig. 3. In this figure is shown a primary winding 39 wound on a transformer core 36 and connected by the conductors 37, 38, to the motor leads 11, 10, respectively, and a secondary winding 40 with conductors 14, 15, connecting it to the slip-rings 12 and 13. By this means the potential applied to the accelerating magnet or magnets may be changed to any desired degree.

Fig. 4 shows as a modification an arrangement whereby the magnets 25', 26', 27' and 28' receive energizing current from the commutator current leads 19' and 20' and are operative to close energizing circuits, in succession, to the magnet windings 41, 42, 43 and 44, respectively from the mains 45 and 46 which are connected to the same source of supply as the motor. The magnets of these latter windings are operative to close the short-circuiting contacts 29', 30', 31' and 32' in succession to accelerate the motor. The advantage of this arrangement is that the magnets energized by the circuit from the frequency changer are small compared with the main magnets and take but little current from the rectifier. Various other modifications are equally obvious.

It is evident that my accelerating device is entirely automatic, requiring no attention, and is proof against careless and incompetent attendants. I desire not to be limited to the exact construction described, as those skilled in the arts to which this application relates may make various changes without departing from the spirit or scope thereof.

What I claim is:—

1. An electro-magnetic motor accelerating device comprising a plurality of successively operable electro-responsive parts, the successive operation of the said parts being dependent upon their energization by a current of constant potential and variable frequency.

2. An electro-magnetic motor accelerating device having movable contacts and dependent for energization upon a current of constant potential and variable frequency.

3. An electro-magnetic motor accelerating device having movable contacts and dependent for operation of the contacts in succession upon a current of uniform impressed electromotive force and variable frequency.

4. A motor accelerating device comprising electro-magnets with windings of different numbers of turns, dependent for operation in regular succession upon a current of constant impressed voltage and variable frequency.

5. A motor accelerating device comprising electro-magnets with windings of different numbers of turns dependent for operation in regular succession upon a current of uniform pressure and decreasing frequency.

6. In a motor accelerating device, the combination of movable contacts, electromagnets operatively energized by currents of different frequencies to operate the contacts, and means to supply a constant potential current of variable frequency to energize the magnets in succession.

7. The combination with a motor of contacts operable by magnets having different numbers of winding turns, and a device to supply constant potential current of decreasing frequency to energize the magnets in succession to control the motor.

8. The combination with a motor of movable contacts, electro-responsive means to operate the contacts, means to change the energizing circuits of the electro-responsive means, and a frequency changer to supply a current of variable frequency to energize the electro-responsive means in succession to control the motor.

9. The combination with a motor of movable contacts, electro-responsive devices to operate the contacts, a frequency changer to supply a current of variable frequency to energize the electro-responsive devices in regular succession to control the motor, and means in connection with the electro-responsive devices to render the device previously operated ineffective.

10. The combination with a motor of electro-responsive magnets with windings of different numbers of turns and in parallel, a frequency changer to supply a current of variable frequency to energize the said devices in regular succession to effect the acceleration of the motor, and back contacts in connection with the magnets to open the winding circuit of the magnet previously energized.

11. The combination with an alternating current motor, of a frequency changer, resistance for the motor, and electro-responsive devices energized in succession by current of varying frequency from the said frequency changer to short-circuit portions of the resistance as the speed of the motor increases.

12. The combination with an alternating current motor, of a frequency changer operated by the motor, and electro-magnets having windings of different numbers of turns energized in succession by current from the said frequency changer of a frequency decreasing as the speed of the motor increases.

13. The combination with an alternating current motor, of a frequency changer receiving current from the motor supply mains and operated by the motor, a plurality of electro-magnets connected in parallel having magnet windings of different numbers of turns receiving current and energized in succession by the current from the frequency changer, and means in connection with the magnets to vary the effective number of turns each time a magnet is energized after the first magnet is energized.

14. The combination with an alternating current motor having slip-ring secondary connections, of a frequency changer receiving current from the supply mains operated by the motor and producing a current of a frequency decreasing as the motor speed increases, a sectional resistance connected to the secondary winding of the motor by means of the slip-rings, electro-magnets having windings of different numbers of turns receiving energizing current from the frequency changer and operative in succession as the frequency decreases, contacts closed by the magnets effective to short-circuit portions of the sectional resistance to accelerate the motor, and back contacts on all of the magnets but the one first energized and effective when operated to open the winding of the magnet previously energized.

15. In an accelerating device, the combination with an alternating current motor, of a frequency changer operated by the motor, and an electro-magnetic device with a plurality of electro-responsive parts receiving current from the motor mains through the frequency changer and dependent for energization upon a current of varying frequency delivered by the frequency changer.

16. The combination of an alternating current motor, a frequency changer operated thereby, electro-responsive devices operable in succession by current of varying frequency from the frequency changer.

17. The combination of an electric motor, electro-responsive devices operable in succession, and a frequency changer controlling such operation.

18. The combination of an electric motor, electro-responsive speed controlling devices, and a frequency changer supplying current of varying frequency to said devices.

19. The combination of an electric motor, accelerating magnets, and a frequency changer driven by the motor and supplying current to the said magnets.

20. The combination of an electric motor, starting resistance, accelerating magnets, and a frequency changer driven thereby and supplying current to said magnet of a frequency varying inversely as the speed of the motor.

In testimony whereof, I have signed my name to this specification in the presence of two subscribing witnesses.

WILLIAM D. LUTZ.

Witnesses:
 EDWARD H. STUT,
 GEORGE D. ROSE.